United States Patent Office 3,023,695
Patented Mar. 6, 1962

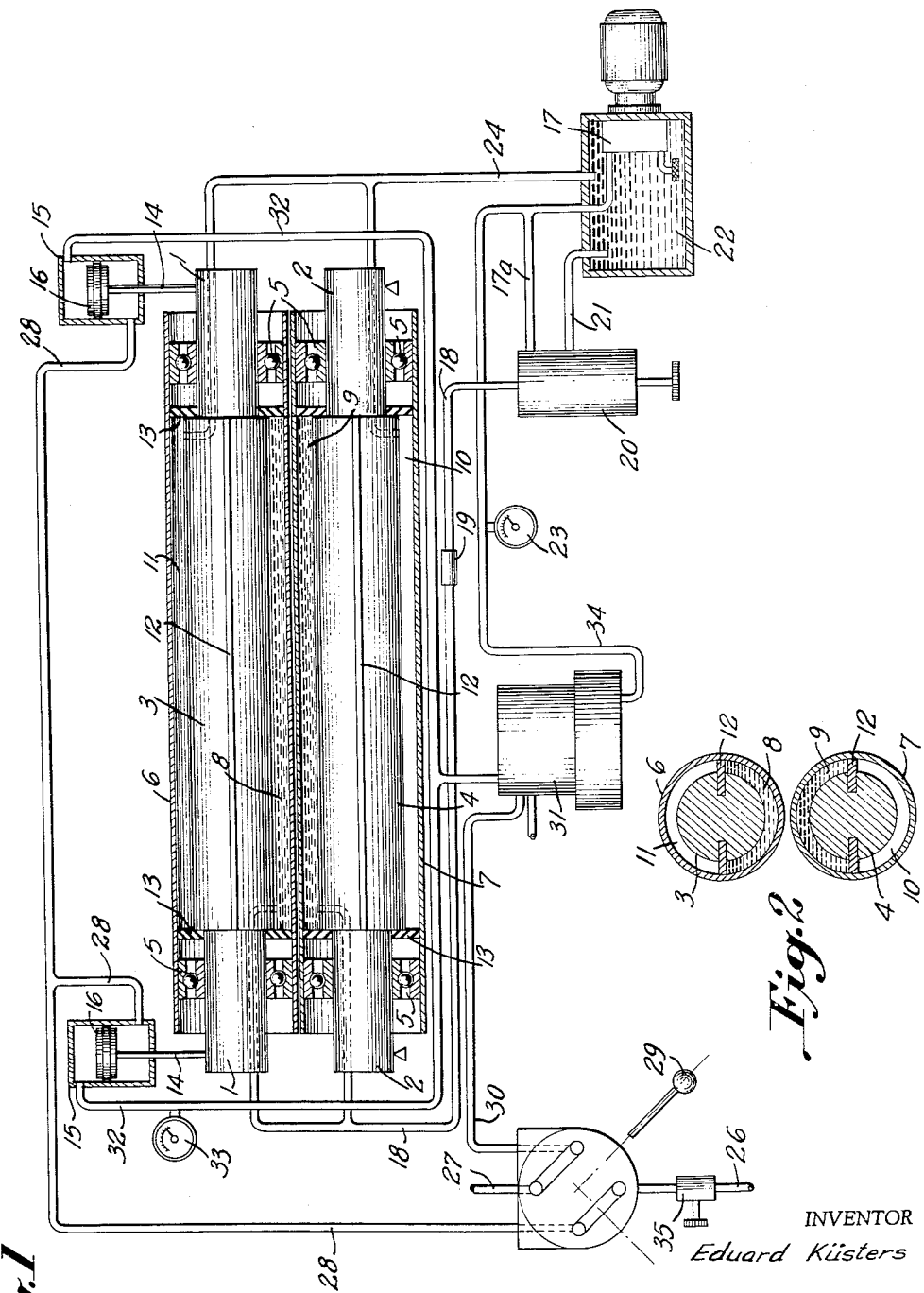

3,023,695
ROLL ARRANGEMENTS FOR SUBJECTING STRIP OR WEB MATERIAL TO PRESSURE TREATMENT
Eduard Küsters, Krefeld, Germany, assignor to Textilmaschinen Eduard Kusters, Krefeld, Germany, a corporation of Germany
Filed Oct. 31, 1958, Ser. No. 771,112
Claims priority, application Germany July 4, 1958
4 Claims. (Cl. 100—170)

The invention relates to a roll arrangement for the pressure treatment of strip or web materials, for example smoothing and embossing paper and other materials, for squeezing the liquor out of textiles, for calendering, for drawing plastic and rubber foils and the like, as well as for other pressing operations, in which the effective roll body is loaded with liquid on its working length on one vertex side which determines the pressure exerted by the roll against a counter-surface.

Roll arrangements of this type have become known for example in a form of construction in which the pressure roll consists of a drum or tubular hollow body designed to rotate as well as forming the periphery of the roll, and a stationary rigid core within this hollow body for taking up the load, whereby a pressure liquid is provided in the space between the whole periphery of the core and the inner wall of the hollow body on the side adjacent the effective point of the roll, which space is sealed off from the portion of the space on the side remote from the point where the roll acts.

In the case of many operations carried out on rolling machines it is desirable that the pressure exerted by the rolls is not kept rigid but is given a certain amount of elasticity. This is particularly important in the case of textile machines, for example dressing and dyeing fullers, water calenders and the like.

Another operation which rolling machines are required to perform is that narrow webs of material can be worked on a machine of great width without causing any serious difficulties or affecting the quality of the products. In the case of such operations it is advisable to give the roll a certain amount of deflection so as to enable, for example, plastic foils or the like to be calendered and drawn in a perfect manner.

The object of the invention is to produce a roll of the type above described, suitable for many purposes, which meets all the requirements mentioned and in addition allows all those working operations to be carried out in an advantageous manner which, owing to the nature or the dimensions of the material to be treated or on account of the result it is desired to obtain, hitherto presented special difficulties or were not even possible.

According to the invention, supplementary devices are provided at the ends of the roll for exerting pressure on the ends of the roll in the direction of a counter surface or a counter roll. Whilst the ends of the roll are loaded, liquid acts on the roll at the same time and effects a uniform pressure.

The exertion of pressure on the ends of the roll can be effected by hydraulic or pneumatic means. Pneumatic pressure is preferable on account of the elasticity which it allows.

If the roll arrangement comprises a roll which consists of a drum-shaped or tubular hollow body designed to rotate and forming the periphery of the roll, and therein a stationary rigid core for taking up the load, whereby in the space existing between the whole periphery of the core and the inner wall of the roll a pressure liquid is provided on the side towards the effective point of the roll with means for sealing off from the portion of the space remote from the effective point, the hollow body is then, according to the invention, mounted at its ends on the core, preferably with the aid of antifriction bearings, and devices are arranged on the end necks of the core for exerting a force tending to press the necks towards a counter surface, for example a counter roll.

The force acting on the ends of the roll can be automatically regulated in the manner above indicated according to the hydraulic pressure exerted on the working length of the roll. By such regulation, the loading of the ends of the roll and the hydraulic pressure acting on the working length of the roll are in a certain relationship to each other even in the case of different working pressures being required.

In addition to the automatic regulation, an independently operable adjusting device is provided according to the invention for selectively adjusting the loading of the ends of the roll. By this means the roll can be deflected in longitudinal direction within certain limits by the hydraulic pressure loading in order, for example, to work particularly narrow webs of material on an extra wide machine.

In a preferred form of construction of the invention preferably pneumatically operated, double-acting pressure cylinders are provided for exerting the force on the ends of the roll. The automatic regulation of this pressure acting in the pressure cylinders is effected by a differential regulator in dependency upon the hydraulic pressure acting on the roll.

The pressure cylinders are double-action cylinders to enable the rolls to be relieved. For this purpose a changeover valve is fitted in the pressure medium feed, when using compressed air as operating medium in the air feed conduit, by means of which valve the upper or lower space of the cylinder can be supplied with pressure medium. A pressure reducing device located in the pressure medium feed conduit serves for the independent adjustment of the load exerted on the ends of the roll.

FIG. 1 is a diagrammatical view of the device.
FIG. 2 is a cross sectional view through the rollers.

In the embodiment of the invention illustrated diagrammatically by way of example in FIGURE 1 of the accompanying drawing, the two cooperating rolls are arranged one above the other, but the invention is not restricted to this form of construction.

Each of the two rolls consists of a crosshead or core 3, 4 provided with lateral necks 1, 2 one at each end and a tube 6, 7 mounted at each end on its core 3, 4 by means of an antifriction bearing 5 and forming the actual roll body. The part 8, 9 of the space between the cores 3, 4 and the tubes 6, 7 adjacent the effective point is filled with pressure liquid and shut off from the part 10, 11 remote from the effective point by closing devices 12 and gaskets 13. The pressure liquid, for example hydraulic oil, is supplied by a pump 17 and fed to the interior of the rolls through the conduit 18 in which an oil filter 19 is arranged. The oil pressure is regulated by a pressure regulator 20, the outlet 21 of which leads into the oil reservoir 22. The effective oil pressure can be read on a pressure gauge 23. The parts 10, 11 of the interior of the rolls remote from the effective point are connected by a conduit 24 to the oil reservoir 22.

The necks 2 of the core 4 are firmly supported as indicated in the drawing. Pistons 16 guided in double-acting pressure cylinders 15 act on the necks 1 of the core 3 of the upper roll through the intermediary of piston rods 14 or the like so as to load the necks 1 and press them towards the counter-roll. The pressure medium, for example air, can be fed to the upper or lower face of the pistons 16 according to the position of a change-over valve 25. The compressed air feed conduit is designated by 26. 27 designates the exhaust conduit.

When the change-over valve 25 is in the position indicated in the drawing, the pressure medium acts on the under surface of the pistons 16 through the conduit 28. For the purpose of loading, the lever 29 of the change-over valve 25 is swung into the position indicated in dot-dash lines when the compressed air will be supplied through the conduit 30 to the differential regulator 31 and then flows therefrom through the conduits 32 into the upper space in the pressure cylinders 15, the air pressure being indicated on a pressure gauge 33. The force exerted on the necks 1 is automatically regulated according to the oil pressure prevailing in the interior of the rolls. This is effected by the differential regulator 31 which is loaded with this pressure through the conduit 34.

An adjusting device 35, that is a pressure reducer, is fitted in the feed conduit in front of the change-over valve 25. With the aid of this device it is possible to deflect the roll within certain limits as may be desirable, for example, when narrow webs are to be worked on a very wide machine.

The switching on and off of the pump 17 serving for supplying pressure liquid to the interior of the roll, can be effected in an advantageous manner by a pressure switch, not shown in the drawing, but which is mounted in the conduit 30 leading from the change-over valve 25 to the differential regulator 31.

With the aid of the invention a roll is produced which can be used for many purposes in various branches of industry, for example in the textile industry, the industry working synthetic materials or the paper making industry and which can be easily adapted for performing all kinds of work owing to the automatic regulation of the load acting on the ends of the roll and the possibility of additional adjustment.

I claim:

1. A roll arrangement for subjecting web materials to pressure treatment comprising a roll body having peripheral means loaded by a pressure medium along its working length only on the working side of said body facing a counter surface, and supplementary means on the ends of said roll body for exerting pressure on its ends in a direction towards said counter surface, said force exerted on the ends of said roll body by said supplementary means being automatically regulatable in a predetermined manner according to the hydraulic pressure exerted on the working length of the roll body.

2. A roll arrangement for subjecting web materials to pressure treatment comprising a roll body having peripheral means loaded by a pressure medium along its working length only on the working side of said body facing a counter surface, supplementary means on the ends of said roll body for exerting pressure on its ends in a direction towards said counter surface, said supplementary means comprising pneumatically actuated double-acting pressure cylinders for exerting pressure on the ends of the roll body, and a differential regulator automatically regulating the pressure acting in said pressure cylinders according to the hydraulic pressure acting on the working length of the roll body.

3. A roll arrangement as set forth in claim 2 wherein said pressure medium is a liquid, a changeover valve fitted in the feed conduit leading to said pressure cylinders for loading and relieving the ends of said roll body, and a pressure reducer fitted in said feed conduit on the admission side of said changeover valve.

4. A roll arrangement for the pressure treatment of strip or web materials comprising a tubular shaped hollow body forming a roll circumference, said body having its ends rotatably supported upon a stiff core, means on said core dividing the annular space between said core and said hollow body into two chambers extending over the working length of said body in the direction of the axis of said core, means for filling only the one of said chambers defined by the working surface of said roll adjacent a counter surface with a fluid pressure medium, a pair of pneumatically actuated double-acting pressure cylinders for exerting pressure on the ends of the roll body, and a differential regulator automatically regulating the pressure acting in said pressure cylinders according to the hydraulic pressure acting on the working length of said roll body.

References Cited in the file of this patent

UNITED STATES PATENTS

| 1,563,130 | Weston | Nov. 24, 1925 |
| 2,205,632 | Schwartz et al. | June 25, 1940 |
| 2,395,915 | Specht | Mar. 5, 1946 |
| 2,691,339 | Edwards | Oct. 12, 1954 |
| 2,908,964 | Appenzeller | Oct. 20, 1959 |